(12) United States Patent
Hiebert

(10) Patent No.: US 7,428,697 B2
(45) Date of Patent: Sep. 23, 2008

(54) PRESERVING CONTENT OR ATTRIBUTE INFORMATION DURING CONVERSION FROM A STRUCTURED DOCUMENT TO A COMPUTER PROGRAM

(75) Inventor: Steven P. Hiebert, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 490 days.

(21) Appl. No.: 10/209,748

(22) Filed: Jul. 31, 2002

(65) Prior Publication Data

US 2004/0025114 A1 Feb. 5, 2004

(51) Int. Cl.
*G06F 17/00* (2006.01)
(52) U.S. Cl. .................................................... 715/234
(58) Field of Classification Search ............... 715/513, 715/515, 901, 900, 234
See application file for complete search history.

(56) References Cited

U.S. PATENT DOCUMENTS 6,594,823 B1 * 7/2003 Corbin et al. ............... 717/143
7,039,859 B1 * 5/2006 Sundaresan ................. 715/513
7,076,728 B2 * 7/2006 Davis et al. ................. 715/513
7,194,683 B2 * 3/2007 Hind et al. .................. 715/522
2003/0163603 A1 * 8/2003 Fry et al. .................... 709/328

OTHER PUBLICATIONS

"Oracle 8i Application Developer's Guide—XML", published Sep. 2000 by Oracle Corporation, p. 1, 2, 7-1 through 7-31, 17-1 through 17-7.*

* cited by examiner

*Primary Examiner*—Doug Hutton
*Assistant Examiner*—Amelia Rutledge

(57) ABSTRACT

A method of preserving a content model of an element during a transformation from a structured document that describes the content model of the element into a computer program includes inputting the structured document into a transformation processor. The method continues with the transformation processor parsing the element into a group of fundamental constructs. The method also includes the transformation processor converting each of the fundamental constructs to a plurality of computer program objects and a content model descriptor that corresponds to each of the computer program objects. The content model descriptor includes the information included in the content model of the element.

20 Claims, 4 Drawing Sheets

PRESERVING CONTENT OR ATTRIBUTE INFORMATION DURING CONVERSION FROM A STRUCTURED DOCUMENT TO A COMPUTER PROGRAM

BACKGROUND OF THE INVENTION

In recent years, a growing number of physical processes and systems have been modeled using computer programs or other structured documents that can be interpreted by a computing resource. By modeling these processes, the processes can be studied and better understood. This enables a research or business organization to optimize the processes in order to achieve maximum financial benefit and/or greater insight into the physical process or system.

For example, one such process that can provide substantial economic benefits as a result of being modeled is the workflow which occurs in a commercial print facility. In a facility of this type, there are numerous mechanical as well as data conditioning tasks that enable the facility to operate at maximum efficiency while producing high-quality printed material. By modeling the processes, each operation and the effects of a change in one or more of the parameters that influence the processes can be studied. Further, the influence of these changes on related processes conducted in the same print facility can also be evaluated.

As part of the modeling process, a structured document, such as a schema written in the Extensible Markup Language (XML), can be used to model the print facility processes. Thus, operations such as paper handling, input data processing, raster image processing, and document binding, can be expressed and characterized using the XML schema. However, the use of a schema or other structured document does not allow a programmer to analyze and evaluate test cases in which parameters of the various operations are modified and their effect on the workflow studied accordingly. In order to perform this type of study, a programmer typically must laboriously write a computer program that allows the programmer to interact with the individual modeled processes. During this tedious process, the programmer must find a way to preserve any content or attribute models contained in the original structured document while the computer program is being developed.

BRIEF DESCRIPTION OF THE SEVERAL COMPUTER PROGRAM LISTING APPENDICES

Appendices A, B, C, and D are computer program listings provided on a compact disc and are incorporated herein by reference.

Appendix A is a sample transformation processor written in the extensible style sheet language (XSL) that preserves content and attribute information from an input structured document written in the extensible markup language (XML);

Appendix B is a sample XML structured document processed by the transformation processor of Appendix A;

Appendix C is a listing of a computer program (written in Java) that results from the conversion of the XML document of Appendix B to Java using the transformation processor of Appendix A; and Appendix D is a listing of the runtime libraries referenced in the Java computer program listing of Appendix C.

DESCRIPTION OF THE PREFERRED EMBODIMENTS

Figure 1:
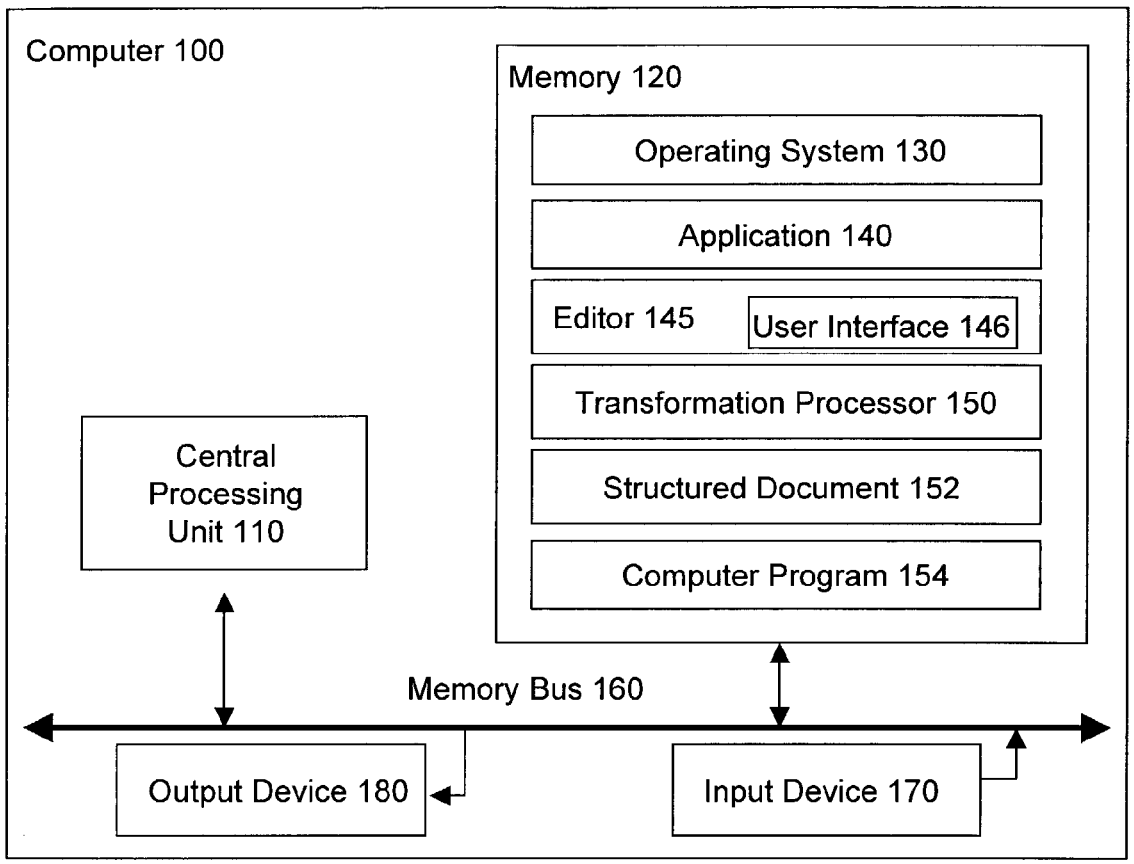
FIG. 1 is a block diagram of a computing resource capable of preserving content or attribute information during conversion from a structured document to a computer program according to an embodiment of the invention.

FIG. 1 is a block diagram of a computing resource capable of preserving content or attribute information during conversion from a structured document to a computer program according to an embodiment of the invention. Computing resource 100 can be any type of desktop, laptop, or handheld computing device capable of performing general or special-purpose computing functions. Computing resource 100 may also be a server or other computing entity that performs a conversion from a structured document to a computer program in addition to performing other computing functions.

In FIG. 1, computing resource 100 includes central processing unit 110, which is coupled to memory 120 by way of memory bus 160. Memory bus 160 may be, for example, a data bus with an accompanying control/address bus. Stored within the address space of memory 120 and executable by central processing unit 110 are operating system 130, application 140, editor 145 (which includes user interface 146), transformation processor 150, structured document 152, and computer program 154 that results from transformation processor 150 operating on structured document 152.

Transformation processor 150 is a software framework that includes one or more input XSLT style sheets and libraries (such as the transformation processor of Appendix A) that implement XSLT transformations described in *XSL Transformations (XSLT) Version 1.0 W3C Recommendation Nov. 16, 1999*. This document can be found at http://www.w3.orq/TR/1999/REC-xslt-19991116. Additionally, structured document 152 accords with the XML Schema Requirements document, available at http://www.w3.org/TR/1999/NOTE-xml-schema-req-19990215, or a later version of the aforementioned document.

In one embodiment, structured document 152 includes elements as well as content and/or attribute models that describe each element. For the purposes describing embodiments of the invention herein, a content model describes the elements that may exist within other elements. Thus, for example, a "complex_type" element that describes a name and address can include three "simple_type" string variables that carry the name (one line) of a particular person, a second line for a street address, and a third line for a city name. In this example, the complex_type definition may also include a postal or zip-code that consists of a single simple_type definition having five decimal characters.

Also for the purposes of describing embodiments of the invention herein, an attribute model describes the attributes which a particular element may carry. Thus, in accordance with the previous example, the complex_type element that describes the name and address can include an attribute that identifies the complex_type as being an address within the United States.

In the embodiment of FIG. 1, input device 170 represents an input device such as a keyboard with an accompanying mouse or other graphical input device. Alternatively, input device 170 may represent a disk drive, external network interface, or other means of loading an input structured document, such as the exemplary XML schema of Appendix B, into transformation processor 150 by way of memory bus 160. Under the control of application 140, transformation processor 150 is loaded into central processing unit 110 and acts upon structured document 152 in accordance with the transformation processor of Appendix A resulting in computer program 154. Editor 145 can then be used to edit computer program 154.

As previously mentioned, transformation processor 150 represents any one of several transformations encoded using the XSL language. Additionally, structured document 152 can represent any one of several documents which includes a content model and an attribute model of each of the elements that describe, for example, the processes which take place in a commercial print facility. An exemplary transformation processor (150) and the templates invoked by the transformation processor is provided in Appendix A. An exemplary XML structured document (152) is included in Appendix B, while Appendix C lists a computer program (154) that results from the conversion of the sample XML structured document of Appendix B to Java by way of the sample transformation processor of Appendix A. Appendix D lists the runtime libraries referenced in the Java computer program listing of Appendix C.

Although the embodiment of FIG. 1 as well as Appendices A, B, C, and D include particular references to XML, XSL, and Java, nothing prevents the use of other markup languages other than XML, such as Standard Generalized Markup Language (SGML), Hypertext Markup Language (HTML), Practical Extraction and Report Language (PERL) or any other language that makes use of structured documents to describe content and attribute models of elements used to describe a process. Further, nothing prevents the use of other transformation processors capable of being executed by general or special-purpose computer systems other than computing resource 100. Finally, the transformation processor may generate any object oriented computer language other than Java.

Computing resource 100 may also include various peripheral devices such as, for example, a keypad, touchpad, touch screen, microphone, scanner, mouse, joystick, one or more push buttons, and so forth. The peripheral devices may also include, indicator lights, speakers, printing devices, and so forth.

Memory 120 is contemplated herein as having volatile or nonvolatile memory and data storage components. Volatile components include those that do not retain data values upon the loss of power. Nonvolatile components are those that retain data upon a loss of power. Thus, memory 120 may comprise random access memory (RAM), read-only memory (ROM), hard disk drives, floppy or compact disks accessed by way of an appropriate disk drive, magnetic tapes accessed by way of an appropriate tape drive, and/or other memory components, or a combination of one or more of the aforementioned memory components. In addition, the RAM may comprise static random access memory (SRAM), dynamic random access memory (DRAM), or magnetic random access memory (MRAM), and other such devices. The ROM may comprise a programmable read-only memory (PROM), erasable programmable read-only memory (EPROM), or other types of memory devices.

Additionally, central processing unit 110 may represent multiple processors and memory 120 may represent multiple memories that operate in parallel. In such an arrangement, memory bus 160 may represent an appropriate network that brings about communication between any two of the multiple processors, between any processor and any one of the memories, or between any two of the memories, and so forth. Operating system 130 of FIG. 1 is executed to control the allocation and usage of hardware resources in computing resource 100 such as the memory, processing time, and peripheral devices. In this manner, operating system 130 serves as a basis on which application 140 depends.

Figure 2:
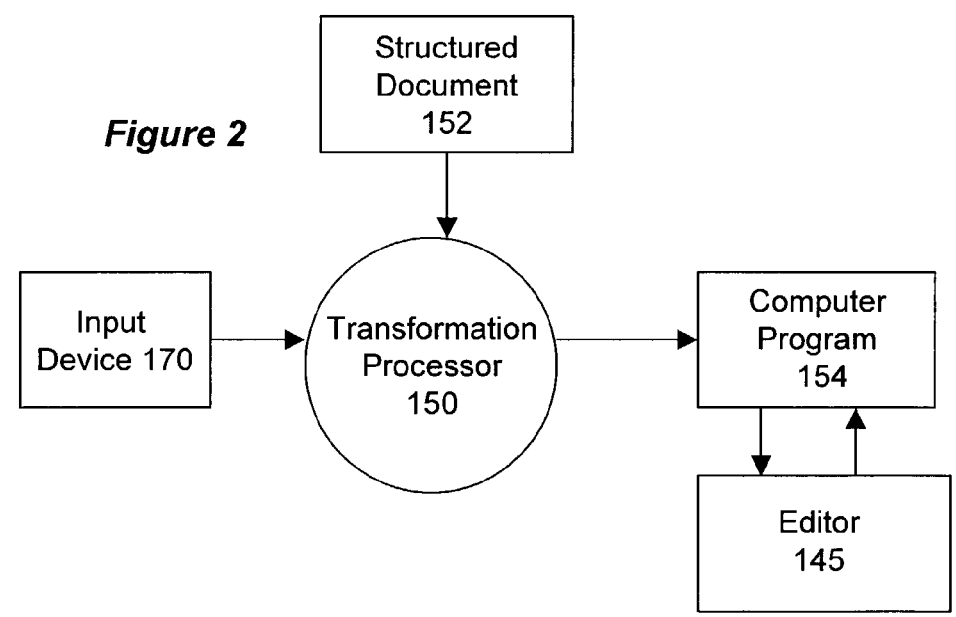
FIG. 2 is a block diagram showing the inputs to a transformation processor that converts a structured document to a computer program according to an embodiment of the invention.

FIG. 2 is a block diagram showing the inputs to a transformation processor that converts a structured document to a computer program according to an embodiment of the invention. In FIG. 2, structured document 152 is input into transformation processor 150. Transformation processor 150 then converts the elements described in structured document 152 to objects of a target computer program, such as Java or other computer language. User interface 146, within editor 145 interacts with computer program 154 to allow a user to manipulate or modify with the resulting objects of computer program 154.

When structured document 152 is converted to computer program 154 by way of transformation processor 150, the syntax information, which includes at least one of the content and attribute models of the elements within structured document 152, is preserved. Thus, transformation processor 150 outputs objects (in a language such as Java) as well as content and attribute model descriptors which include the information contained in the respective content and attribute models of each element as described in structured document 152. This removes or at least reduces the need for testing of the individual Java objects generated by transformation processor 150 to determine if the object is a "well formed" representation of the corresponding element described in structured document 152. For the purposes of describing embodiments of the present invention, the term "wellformed" implies that an object that results from a conversion from an element retains and conforms to at least one of the content and attribute models described in the description of the element in the originating structured document.

An example of a content model descriptor can be found in the Java code listing of Appendix C, at lines 28-31 of page 1 of the appendix. For convenience, this sample content model descriptor is repeated below. When reviewing the computer program listing of Appendix C, those of skill in the art will recognize numerous other instances of content model descriptors that are of a form that accords with the example below.

```
    private ModelItem[ ] model =
{
    new ModelItem(new sample__ELEMENT__datumFactory( ) )
};
```

Further, an example of an attribute model descriptor can be found at lines 38-43 of Appendix C. For convenience, this sample attribute model descriptor is repeated below. When reviewing the computer program listing of Appendix C, those of skill in the art will recognize other attribute model descriptors that are of a form that accords with the example below.

```
        private AttributeBase[ ] _attributes =
{
        new AttributeBase("type",
           new_sample_typeFactory( ),
           "required")
};
```

In FIG. 2, editor 145 includes a user interface (not shown in FIG. 2) that enables a user to interact with the objects of computer program 154. Additionally, due to the preservation of the syntax information for each element described in structured document 152, as editor 145 receives editing commands from a user the editor can validate the inputs against each object's content model descriptor and/or attribute model descriptor. In the event that the user is attempting to make changes to the content or an attribute of an object which is not in agreement with the corresponding element's content or attribute model contained in structured document 152, editor 145 can post a notification to the user informing the user that the requested modification is not allowable. An example of a change that might cause editor 145 to post such a notification may result from the user attempting to insert a non-decimal character (such as an "A") into a zip-code field of a Java object in which the object corresponds to a simple_type having a content model that restricts the field as being allowed to assume only decimal characters. Additionally a notification may be posted when, for example, a user attempts to change an attribute of the complex_type to something other than a country (such as the United States).

Although not specifically identified in FIG. 2, editor 145 can make use of an input device, such as input device 170, which accepts or conveys inputs from a user. Further, editor 145 can also make use of an output device, such as output device 180, which can be a computer monitor that displays information to the user.

Figure 3:
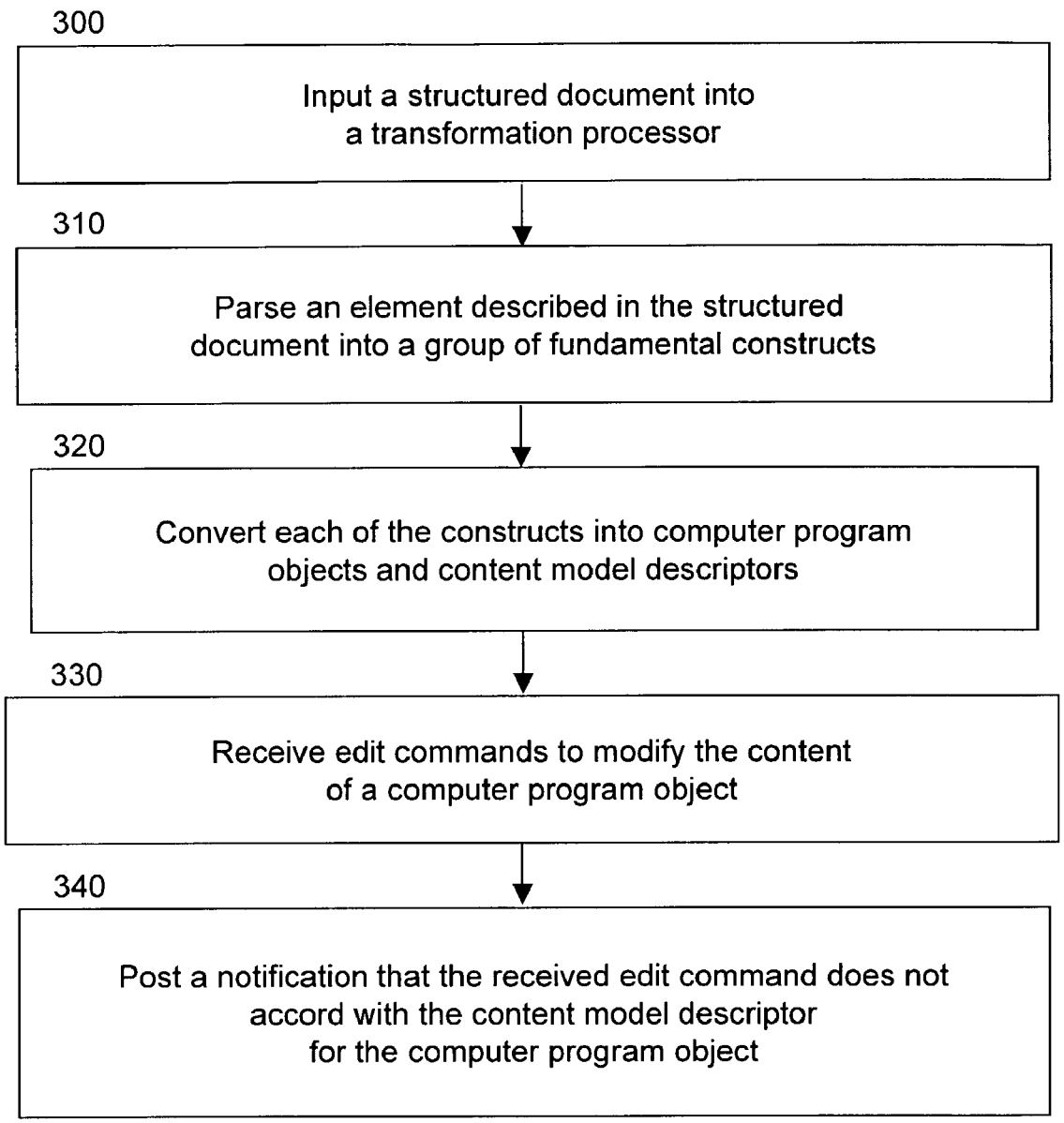
FIG. 3 is a flowchart for a method of preserving a content model of an element during a conversion from a structured document that describes the content model of the element to a computer program according to an embodiment of the invention.

FIG. 3 is a flowchart for a method of preserving a content model of an element during a conversion from a structured document that describes the content model of the element to a computer program according to an embodiment of the invention. Computing resource 100 may be suitable for performing the method of FIG. 3. The method of FIG. 3 begins at step 300 in which a structured document is input to a transformation processor. In the method of FIG. 3, the structured document at least includes a description of the content model of the element. Preferably, the content model describes the attributes that can exist within the element. The structured document may also distinguish those elements types that are allowed to carry content from those elements types that are not allowed to carry content. As previously mentioned, and exemplary structured document can be an XML schema similar to the XML schema presented in the computer program listing of Appendix B. In an alternate embodiment, the structured document may be expressed in a language other than XML Schema.

Figure 4:
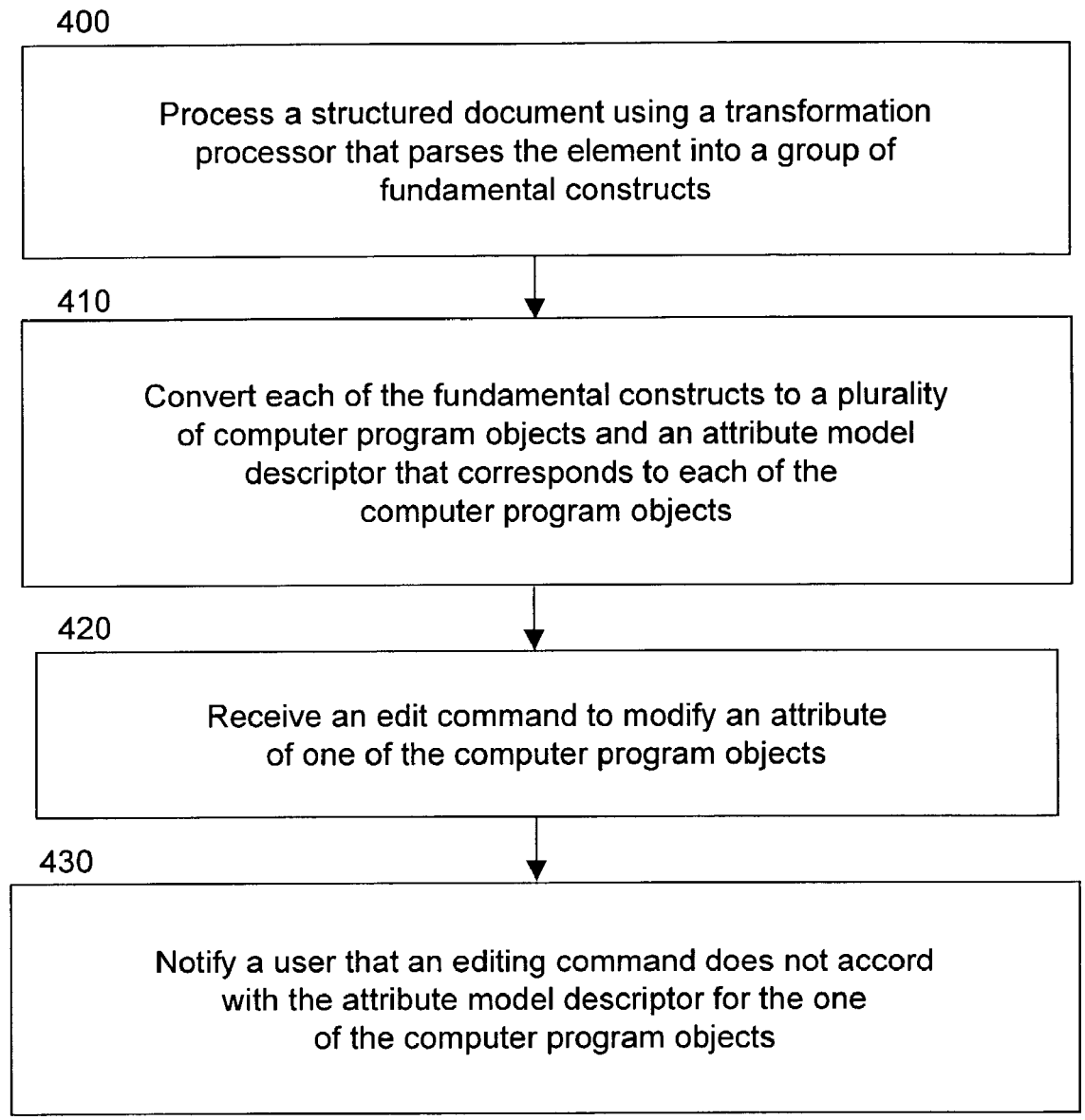
FIG. 4 is a flowchart for a method of preserving an attribute model of an element during a conversion from a structured document that describes the attribute model of the element into a computer program according to an embodiment of the invention.
Figure 5:
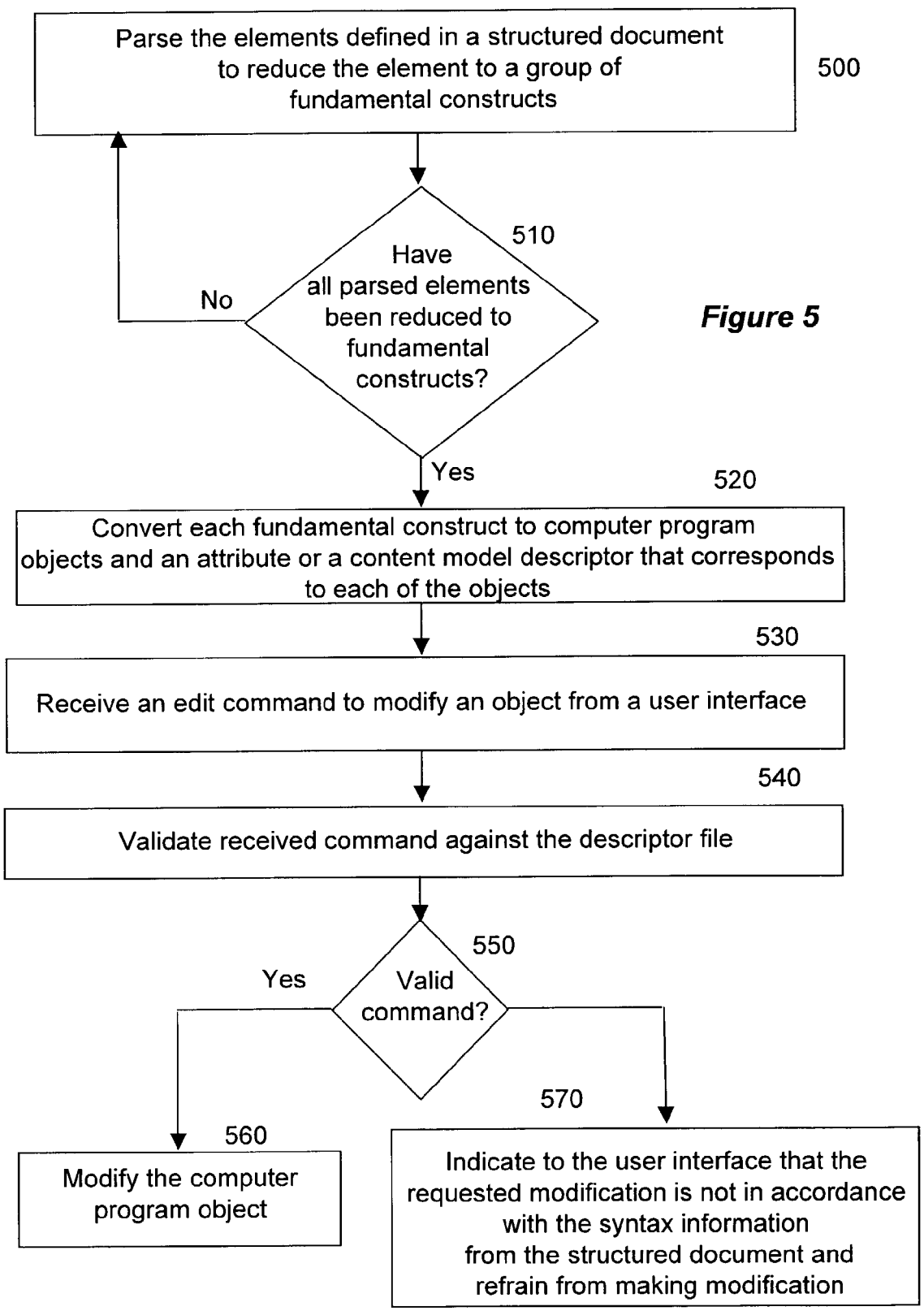
FIG. 5 is a flowchart for a method of preserving the syntax information of the elements defined in a structured document during a conversion of the structured document into a computer program according to an embodiment of the invention.

The method continues at step 310 in which at least one element described in the structured document is parsed into a group of fundamental constructs. In the method of FIGS. 3, 4, and 5, the term "fundamental construct" implies the basic constituent elements that form the structured document. For example, in the case of a structured document represented by an XML schema, the fundamental constructs would include the simple_type elements, as well as compositors that define the content sequence of the element. Step 310 may be performed more than once in the event that a first parsing of the element does not result in the element being transformed into the simplest element type allowed in the structured document. When reviewing the computer program listing of Appendix A (sample transformation processor), those of skill in the art will recognize that each template of the transformation processor processes a particular construct that results from the processing of the XML schema of Appendix B.

After performing step 310 at least once, the method of FIG. 3 continues at step 320 in which each of the constructs that result from the parsing of step 310 are converted into computer program objects and content model descriptors. This conversion may be the result of using a transformation processor such as described in reference to FIGS. 1 and 2 and in Appendix A, herein.

The method continues at step 330, which includes receiving a command to modify the content of at least one computer program object. As mentioned previously herein, preservation of the content model from the originating structured document enables the editor to validate any received commands to modify a particular computer program object resulting from the parsing of elements of the structured document. Thus, at step 340, the editor posts a notification that the received editing command does not accord with the content model descriptor for the particular computer program object.

Although the method of FIG. 3 has been described as including steps 300, 310, 320, 330, and 340, some embodiments may include only step 300, in which a structured document is input into a transformation processor, step 310, in which at least one element described in the structured document is parsed into a group of fundamental constructs, and step 320, in which each of the constructs is converted into computer program objects and content model descriptors.

FIG. 4 is a flowchart for a method of preserving an attribute model of an element during a conversion from a structured document that describes the attribute model of the element into a computer program according to an embodiment of the invention. The method of FIG. 4 can be performed by computing resource 100 as described herein. Additionally, the transformation processor and the structured document mentioned in FIG. 4 may be an XSLT processor, and an XML schema, respectively.

The method of FIG. 4 begins at step 400 in which a structured document is processed using a transformation processor that parses an element into a group of fundamental constructs. Preferably, the attribute model referred to in FIG. 4 includes information as to which attributes can be associated with the element. For example, for an element that identifies an address of a person, allowable attributes for the address might include a country equal to "United States". However, the country attribute is not allowed to equal "North Dakota". Further, the attribute model present in the structured document of FIG. 4 may have been assigned a default value, such as, for example country equals "United States". Alternatively, the attribute model may have been assigned a required value, such as for the case when country is required to equal "United States."

The processing described in step 400 may include recursively parsing the element until the element has been transformed into the simplest element type allowed in the structured document. As previously mentioned, an example of the simplest element type in XML, may be a simple_type, a compositor, and so forth. The method continues at step 410, which includes converting each of the fundamental constructs to a plurality of computer program objects and an attribute model descriptor that corresponds to each of the computer program objects. The method continues at step 420 in which an edit command to modify an attribute of one of the computer program objects is received. The method continues at step 430 in which a user is notified that a particular editing command does not accord with an attribute model descriptor for one of the computer program objects.

Although the method of FIG. 4 has been described as including steps 400, 410, 420, and 430, some embodiments of the invention may only include step 400 in which a structured document is processed using a transformation processor, and step 410 in which each of the fundamental constructs is converted to a plurality of computer program objects.

FIG. 5 is a flowchart for a method of preserving the syntax information of the elements defined in a structured document during a conversion of the structured document to a computer program according to an embodiment of the invention. The method of FIG. 5 can be performed using computing resource 100 shown in FIG. 1. The method of FIG. 5 begins at step 500, which includes parsing the elements defined in a structured document to reduce the elements to a group of fundamental constructs.

The method continues at step 510 in which a determination is made as to whether the parsed elements have been reduced to fundamental constructs. If the decision of step 510 indicates that the parsed elements have not been reduced, step 500 is executed again. In the event that the parsed elements have been reduced to fundamental constructs, step 520 is executed, which includes converting each fundamental construct to computer program objects and an attribute or content model descriptor that corresponds to each of the objects.

At step 530, a command to edit or modify an object is received from a user interface. The user interface of step 530 may include one or more of input device 170 and output device 180 of computing resource 100 of FIG. 1 operating in conjunction with editor 145 and user interface 146, which operates within editor 145. At step 540, the received command is validated against the content or model descriptor. The method continues at step 550, in which a determination is made as to whether the received command represents a valid operation that can be performed in accordance with the syntax information. In the event that the received command is valid, step 560 is executed in which the computer program object is modified. If the decision of step 550 indicates that the received command is not valid, step 570 is executed, which includes indicating to the user interface that the requested modification is not in accordance with the syntax information (content or attribute model information) from the structured document. Also at step 570, the method refrains from making the requested modification.

Although the method of FIG. 5 includes steps 500, 510, 520, 530, 540, 550, 560, and 570, embodiments of the invention may include only steps 500, in which and element defined in a structured document is parsed to reduce the element to a set of fundamental constructs, and step 520 in which each of the constructs is converted to computer program objects and a content or attribute model descriptor.

While the present invention has been particularly shown and described with reference to the foregoing embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method of preserving a content model of an element during a transformation from a structured document that describes the content model of the element into a computer program, the method comprising:

inputting the structured document into a transformation processor, wherein the structured document is an XML schema;

the transformation processor parsing the element into a group of fundamental constructs;

the transformation processor converting each of the group of fundamental constructs to a plurality of computer program objects and a content model descriptor that corresponds to each of the computer program objects, the content model descriptors including the content and attribute model descriptors from the structured document that describes the content model;

producing the objects as well formed representations of corresponding elements described in the structured document without modifying original syntax by preserving the original syntax defined in the structured document during conversion of the structured document into the computer program;

determining if the object is a well formed representation of the corresponding element described in the structured document without testing individual objects generated by the transformation processor, wherein a well formed representation of an object results from a conversion from an element retaining and conforming to at least one of the content and attribute models described in the description of the element in the originating structured document; and preventing a user in real time from making changes to the content and attributes of an object not in agreement with content and attribute models of corresponding elements contained in the structured document;

wherein the parsing includes recursively parsing the element until the element has been transformed into the simplest element types allowed in the structured document, and wherein the parsing includes a simple type and a compositor in the structured document.

2. The method of claim 1, wherein the content model additionally describes attributes that can exist within the element.

3. The method of claim 1, wherein the structured document distinguishes those element types that are allowed to carry content from those elements types that are not allowed to carry content.

4. The method of claim 1, additionally comprising receiving an editing command to modify one of the plurality of computer program objects.

5. The method of claim 4, additionally comprising posting a notification that the received editing command does not accord with at least one content model descriptor for the one of the plurality of computer program objects.

6. A method of preserving content and attribute model descriptors in a model of an element during a transformation from a structured document that describes the content and attribute model descriptors into a computer program, the method comprising:

processing the structured document using a transformation processor that parses the element into a group of fundamental constructs, wherein the structured document is an XML schema;

the transformation processor converting each of the fundamental constructs to a plurality of computer program objects and an attribute model descriptor that corresponds to each of the plurality of computer program objects, the model descriptor including the content and attribute descriptors from the structured document that describes the element;

producing the objects as well formed representations of corresponding elements described in the structured document without modifying original syntax defined in the structured document during conversion of the structured document into the computer program by preserving the original syntax;

determining if the object is a well formed representation of the corresponding element described in the structured document without testing individual objects generated by the transformation processor, wherein a well formed representation of an object results from a conversion from an element retaining and conforming to at least one of the content and attribute models described in the description of the element in the originating structured document; and preventing a user in real time from making changes to the content and attributes of an object not in agreement with content and attribute models of corresponding elements contained in the structured document;

wherein the parsing includes recursively parsing the element until the element has been transformed into the simplest element types allowed in the structured document, and wherein the parsing includes a simple type and a compositor in the structured document.

7. The method of claim 6, wherein the attribute model includes information as to which attributes can be associated with the element.

8. The method of claim 7, wherein the attribute model includes an indication of whether an attribute has been assigned a default value in the structured document.

9. The method of claim 7, wherein the attribute model includes an indication of whether an attribute has been assigned a required value in the structured document.

10. The method of claim 6, wherein the structured document is an extensible markup language (XML) schema, and wherein the transformation processor is an extensible style language transformation (XSLT) processor.

11. The method of claim 6, wherein the processing step includes recursively parsing the element until the element has been transformed into the simplest element type allowed by the structured document.

12. The method of claim 6, additionally comprising receiving an editing command to modify an attribute of one of the plurality of computer program objects.

13. The method of claim 12, additionally comprising posting a notification that the received editing command does not accord with the information included in the attribute model of the element.

14. A method of preserving the content and attribute model descriptors of the elements defined in a structured document during a transformation of the structured document into a computer program, the method comprising:

parsing the elements defined in the structured document to reduce the element to a group of fundamental constructs, wherein the structured document is an XML schema;

the transformation processor converting each of the group of fundamental constructs to a plurality of computer program objects and a descriptor that corresponds to each of the plurality of computer program objects, wherein the descriptor includes the content and attribute information of the elements defined in the structured document;

producing the objects as well formed representations of corresponding elements described in the structured document without modifying original syntax defined in the structured document during conversion of the structured document into the computer program by preserving the original syntax;

determining if the object is a well formed representation of the corresponding element described in the structured document without testing individual objects generated by the transformation processor, wherein a well formed representation of an object results from a conversion from an element retaining and conforming to at least one of the content and attribute models described in the description of the element in the originating structured document; and preventing a user in real time from making changes to the content and attributes of an object not in agreement with content and attribute models of corresponding elements contained in the structured document;

wherein the parsing includes recursively parsing the element until the element has been transformed into the simplest element types allowed in the structured document, and wherein the parsing includes a simple type and a compositor in the structured document.

15. The method of claim 14, additionally comprising the step of determining whether a parsed element, resulting from the parsing step, has been reduced to a group of fundamental constructs.

16. The method of claim 15, additionally comprising performing a second parsing step if the determining step indicates that the parsed element has not been reduced to a group of fundamental constructs.

17. The method of claim 14, additionally comprising receiving an edit command from a user interface, the edit command being intended to modify at least one of the plurality of computer program objects.

18. The method of claim 17, additionally comprising the step of indicating to the user interface that the received edit command represents a request to modify the at least one of the plurality of computer program objects in a manner that is not in accordance with the content and attribute information defined in the structured document.

19. The method of claim 17, additionally comprising the step of responding to the received edit command by modifying the at least one of the plurality of computer program objects.

20. The method of claim 17, additionally comprising validating the received edit command against the descriptor.

* * * * *